Feb. 27, 1962 S. J. KOPEC 3,022,710
BROACH ASSEMBLY
Original Filed Nov. 25, 1953 4 Sheets-Sheet 1

Inventor
Stanley J. Kopec
By Charles L. Loverchek
Attorney

Feb. 27, 1962 S. J. KOPEC 3,022,710
BROACH ASSEMBLY
Original Filed Nov. 25, 1953 4 Sheets-Sheet 2

Inventor
Stanley J. Kopec
By
Charles L. Lorenbeck
Attorney

INVENTOR.
Stanley J. Kopec
BY Charles L. Lovercheck

Feb. 27, 1962   S. J. KOPEC   3,022,710
BROACH ASSEMBLY

Original Filed Nov. 25, 1953   4 Sheets-Sheet 4

INVENTOR.
BY Stanley J. Kopec
Charles L. Losenchuk

United States Patent Office 3,022,710
Patented Feb. 27, 1962

3,022,710
BROACH ASSEMBLY
Stanley J. Kopec, 597 Randolph St., Northville, Mich.
Continuation of application Ser. No. 394,407, Nov. 25, 1953. This application Nov. 1, 1956, Ser. No. 619,874
6 Claims. (Cl. 29—95.1)

This invention relates to broaches and, more particularly, to broaches for cutting helical teeth on broach bodies for forming helical teeth on gears, ammunition rotating bands, and the like.

This is an improvement on the invention disclosed in my Patent No. 2,629,294, issued February 24, 1953, and is a continuation of patent application, Serial No. 394,407, filed November 25, 1953, now abandoned.

In the said parent application, an improved broach is disclosed wherein the cutting teeth of the broach have cutting surfaces on both the tips and the flanks thereof. This distinguishes over broaches which have been known heretofore in that prior broaches usually had cutting edges on the tips only of the teeth.

For certain applications, it is necessary to have a guiding means between the various broach ring stages to insure that the blanks are guided through the broach in a true helical path or in a straight path. This is accomplished by providing non-cutting pilot rings between the stages. Also, in this combination, there may be a plurality of conventional teeth on rings rough cutting the teeth on the blank with a ring having finish cutting surfaces on both flank and tip thereof being shaped to conform to the shape of the tooth being formed.

It is, accordingly, an object of this invention to overcome defects in prior broaching devices and, more particularly, it is an object of this invention to provide a novel broach for cutting helical teeth which is simple in construction, economical in cost, economical in manufacture, and efficient in operation.

Another object of the invention is to provide a broach for cutting helical teeth or spur gear teeth whereby one section thereof rough cuts the teeth and the latter sections thereof finish the teeth.

Still another object of the invention is to provide means for guiding a blank through a broach by providing a non-cutting pilot stage between various stages of the broach.

A further object of this invention is to provide a ring broach for cutting helical teeth or spur gear teeth which has non-cutting pilot stages with plain helical teeth between various stages of the broach rings.

A still further object of the invention is to provide a novel type of broach wherein alternate stages are cut from the roots of the teeth and other alternate stages will cut from the sides and flanks of the teeth.

Yet another object of this invention is to provide a ring broach wherein a series of stages thereof will cut material from the root of the teeth and gear blank and the next stages will cut material from the sides of the teeth.

Yet a further object of the invention is to provide a ring broach wherein the various stages of the broach will cut progressively on the sides and root of the tooth and the last stage of the broach will make a finish cut on the sides and the root of the tooth.

Another object of the invention is to provide a ring broach wherein the various stages of the broach will cut on various portions of the teeth and the final stage will finish cut the sides of the teeth.

Another object of this invention is to provide a ring broach for cutting helical teeth on a blank wherein a helical spline pilot ring is disposed on the broach ring assembly after the final cutting stages in order to assist in guiding the shell or gear through the final stage.

It is still another object of this invention to provide a ring broach for cutting helical teeth on a blank wherein a driver travelling in a helical path is provided for pushing the blank through the ring broach.

It is still a further object of this invention to provide a ring broach which is adaptable for use in either a horizontal or a vertical position and wherein the broach may be pushed over the blank or the blank may be pushed through the broach.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
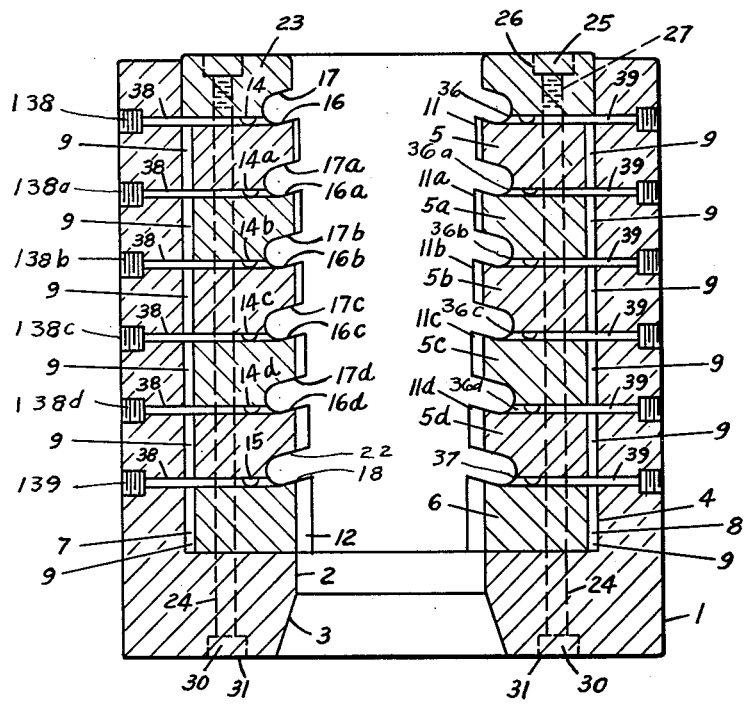
FIG. 1 shows a ring broach according to the invention wherein a pilot ring is shown in combination with a plurality of rough cutting stages and one finishing stage.

Referring more specifically to the drawings, FIG. 1 shows a cup shaped holding member 1 having an axially extending aperture 2. The aperture 2 is tapered at 3 and counterbored at 4. Annular broach rings 5, 5a, 5b, 5c, 5d, and 6 are disposed in the counterbore 4 in axial alignment therewith.

The rings 5, 5a, 5b, 5c, and 5d have longitudinally extending grooves 7 and 8 for engaging keys 9 in the counterbore 4. The broach rings 5, 5a, 5b, 5c, and 5d have helical shaped cutting teeth 11, 11a, 11b, 11c, and 11d, respectively, for "hogging off" or rough cutting the major portion of the material to be removed from between the sides and roots of the teeth of a gear blank or on the rotating band of a projectile passing through the broach. Teeth 12 on the broach ring 6 are of a predetermined size and diameter to cut the finished tooth profile required on the teeth of the blank or rotating band of the projectile. Each ring 5, 5a, 5b, 5c, 5d, and 6 has annular semi-circular shaped intermediate grooves 14, 14a, 14b, 14c, 14d, and 15 at the top side thereof and each ring 5, 5a, 5b, 5c, 5d, and 6 has an inner marginal groove 16, 16a, 16b, 16c, 16d, 17, 17a, 17b, 17c, and 17d formed therein. The grooves 16, 16a, 16b, 6c, and 16d merge in the grooves 17, 17a, 17b, 17c, and 17d on the underside of the pilot ring and on the underside of the preceding ring thereto. The groove 17 on the broach ring 6 merges with a marginal groove 22 on the underside of the broach ring 5d. In like manner, on the finish stages, the groove 22 merges with a groove 18.

A pilot ring 23 is disposed in the counterbore 4 of the holding member 1 in axial alignment with the broach rings 5, 5a, 5b, 5c, 5d, and 6. The pilot ring 23 and the broach rings are connected in the counterbored member 4 by means of bolts 24 which are threaded to receive nuts 25 which are seated in a counterbore 26 and are attached to a threaded end 27 of the bolts 24. Heads 30 of the bolts 24 are nested in counterbores 31 in the end of the counterbored member 4.

The annular grooves 14, 14a, 14b, 14c, 14d, and 15 are connected with the open inner annular grooves 16, 16a, 16b, 16c, and 16d by passages 36, 36a, 36b, 36c, 36d, and 37 which are tangent to the outer diameter of the open grooves so that air passing from the grooves 14, 14a, 14b, 14c, 14d, and 15 to the open inner grooves will move circularly therearound to form a turbulent air stream therein and to cool the teeth of the broach rings and to cool the chips therein and move the chips in a circular path.

The inner open grooves provide a depository for the chips cut from between the teeth on the blank or band. Air is passed to the grooves 14, 14a, 14b, 14c, 14d, and 15 through passages 38 connected to a suitable air source by threaded counterbores 138, 138a, 138b, 138c, 138d, and 139. Lubricant likewise may be passed into the circular grooves 14, 14a, 14b, 14c, 14d, and 15 through passageways 39 whereby it passes to the cutting teeth of the broach rings 5, 5a, 5b, 5c, 5d, and 6 to provide lubrication for the teeth.

The axially extending width of the inner open grooves is preferably less than the width of the teeth to be formed on the workpiece in order that the workpiece will move in a true helical path without any tendency to become misaligned. The internal diameter of the pilot ring 23 is approximately the size of the diameter of the projectile so that the projectile or gear blank may be guided in a straight line through the broach assembly. The pushing member shown in FIG. 11 may be either a straight ram or it may be clamped to the gear to rotate the gear in the desired helical path.

Figure 2:
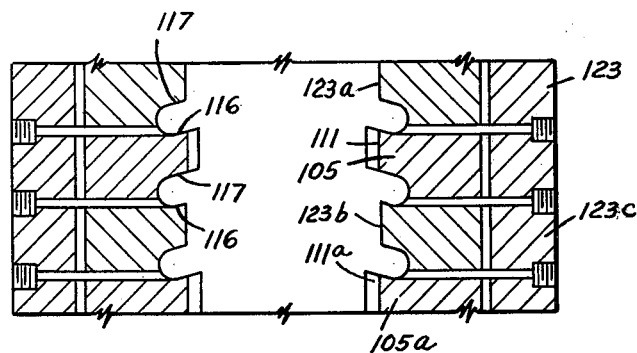
FIG. 2 shows a plurality of intermediate cutting stages for the ring broach having pilot rings disposed between alternate stages.

In the embodiment of the invention shown in FIG. 2, plain pilot rings 123 and 123c are disposed between rough cutting stages 105 and 105a. The rough cutting stages 105 and 105a are exactly the same as the rough cutting stages 5, 5a, 5b, 5c, and 5d shown in FIG. 1; however, it has been found desirable in certain applications of tooth cutting to provide plain pilot rings between the rough cutting stages on a ring broach. The rough cutting stages 105 and 105a have cutting teeth 111 and 111a thereon and plain pilot rings 123 and 123c have inner surfaces 123a and 123b which are adapted to slidingly engage the outer periphery of the blank as it is pushed through the broach. The broach rings are provided with grooves 116 which merge into grooves 117 exactly as the grooves in the embodiment of the invention shown in FIG. 1 and the air passages, lubricating passage, and supporting means may be the same in this embodiment of the invention as that in the embodiment shown in FIG. 1. It has been found desirable in some applications to have one intermediate plain pilot ring between two roughing stages and in other applications to have an intermediate pilot ring between each alternate stage.

Figure 3:
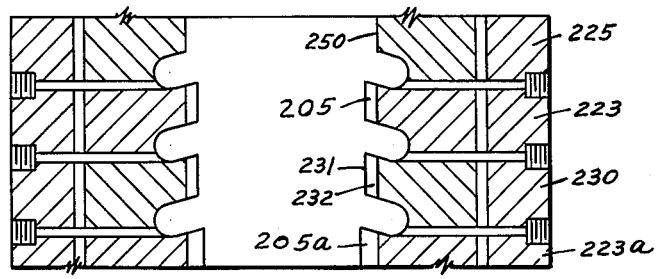
FIG. 3 shows a plurality of intermediate broach ring stages having a plain non-cutting pilot ring disposed between cutting stages wherein the teeth on the pilot ring are of the same shape as the teeth on the cutting stage preceding it.

The embodiment of the invention shown in FIG. 3 shows broach rings 223 and 223a which are taken from a section of a broach assembly similar to the assembly shown in FIG. 1. A pilot ring 225 has a smooth inside surface 250 to engage the outside of the blank and rough cutting teeth 205 and 205a are disposed around the periphery of the inside of each broach ring. A pilot ring 230 is disposed between the rings 223 and 223a and an inside surface 231 is smooth and there is not cutting edge thereon. Teeth 232 are made in the form of a helix to follow the path cut by the stage 205 in the head thereof to guide the blank through the broach ring. These non-cutting helical teeth may be disposed between alternate cutting stages or they may be arranged between various stages or cutting rings throughout the broach as required for the individual application.

Figure 4:
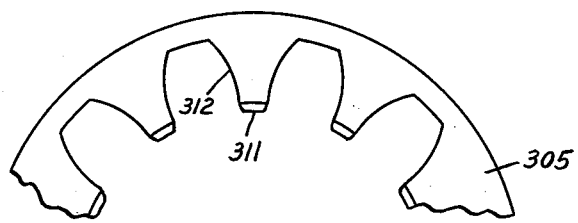
FIG. 4 shows a section of a ring broach wherein the sections of rings shown rough cut on the root of the tooth only.

In broaches of the form shown in FIG. 1, it has been found desirable in some applications to alternate the cutting action of the stages as the work proceeds through the broach. For example, in FIG. 4, a ring broach stage is shown which is adapted to cut on the root of the tooth only; that is, the cutting surface 311 is formed on the inside of each cutting tooth while edges 312 are smooth and do no cutting. A ring portion 305 corresponds to the ring portion 23 on the broach member shown in FIG. 1.

Figure 5:
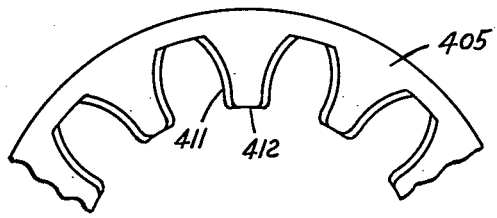
FIG. 5 shows a section of a ring broach wherein the rings shown rough cut on the sides of the tooth only.

FIG. 5 discloses a broach ring 405 which is adapted to cut on the sides of the teeth only having the cutting surfaces 411 on the edges which are adapted to engage the sides of the teeth and the tips of cutting teeth 412 are smooth and do no cutting. The broach rings such as the ring 305 shown in FIG. 4 and the ring 405 shown in FIG. 5 may be alternated in a ring broach assembly; that is, a broach ring having teeth cutting on the sides of the teeth will follow a ring having teeth cutting on the root, etc. so that one broach ring will cut on the root of a tooth and the next will cut on the side in a broach assembly such as shown in FIG. 1. In other applications, it has been discovered that it is desirable to have a series of rings carrying cutting teeth, such as the ring 305, to cut the root of the blank teeth followed by a series of rings cutting the flank or side of the tooth in a broach assembly such as shown in FIG. 1. It is desirable in some such cases to provide a non-cutting pilot ring between various intermediate stages of broach rings.

Figure 6:
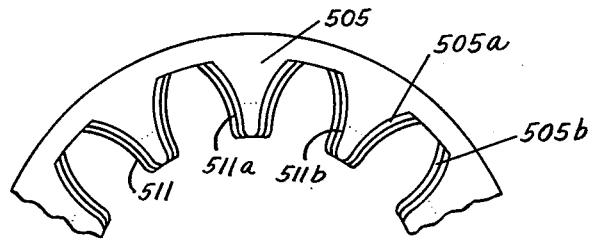
FIG. 6 shows a section of a ring broach wherein several rings of the section of the rings shown finish cut on the sides of the tooth of the gear blank.
Figure 7:
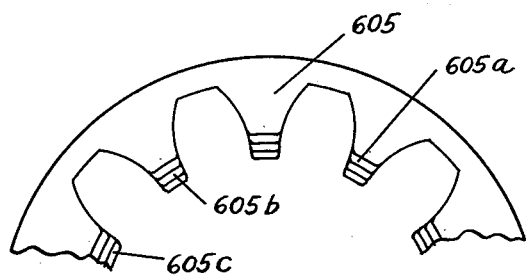
FIG. 7 shows several stages of the rings of a ring broach wherein the cutting states finish cut on the roots of the teeth of the gear blank only.

In FIG. 6, a series of broach rings 505, 505a, and 505b are shown disposed with cutting edges 511, 511a, and 511b for cutting on the side of the tooth. In FIG. 7, a series of broach cutting rings 605, 605a, 605b, and 605c are disposed to cut in sequence on the root of the teeth of the blank only. In some applications, it is desirable to put the broach rings shown in FIG. 6 in one sequence and the broach rings shown in FIG. 7 in another sequence to follow the broach rings shown in FIG. 6 to form pre-engraved bands on a rotating band of a shell or to form helical teeth or spur gear teeth on a gear blank.

Figure 8:
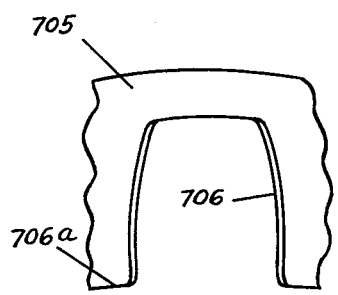
FIG. 8 shows the final stage of a ring broach wherein the final stages finish cut on the sides of the teeth only.
Figure 9:
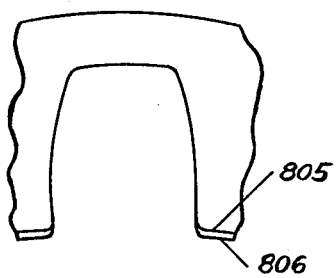
FIG. 9 shows a section of the final stages of the ring broach wherein the teeth of the rings finish cut on the root of the tooth only.
Figure 10:
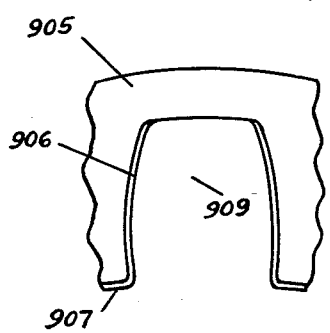
FIG. 10 shows the final stages of a ring broach wherein the teeth of the rings finish cut on both sides and roots of the teeth of the gear blank.

FIG. 8 shows a cutting ring 705 having a cutting edge 706 for cutting on the side of the tooth only and showing a smooth surface 706a for smoothly sliding over the root. FIG. 9 shows a section of a broach ring having finished teeth 805 having cutting edge 806 for cutting on the root only. In the same application for cutting certain materials, it has been found that it is desirable to have the broach rings in the final finished stage perform two separate functions, one to cut on the side of the tooth to finish the flank thereof only and the following stage to finish the root thereof only. It has been found advantageous in some cases to put the root finishing stage ahead of the side finishing stage and vice versa. The section of broach ring shown in FIG. 10 shows a cutting tooth 905 of a broach ring, the tooth having a cutting edge 906 for cutting the edge of the blank tooth and an edge 907 for cutting the root of the tooth, the tooth being disposed at 909.

Figure 11:
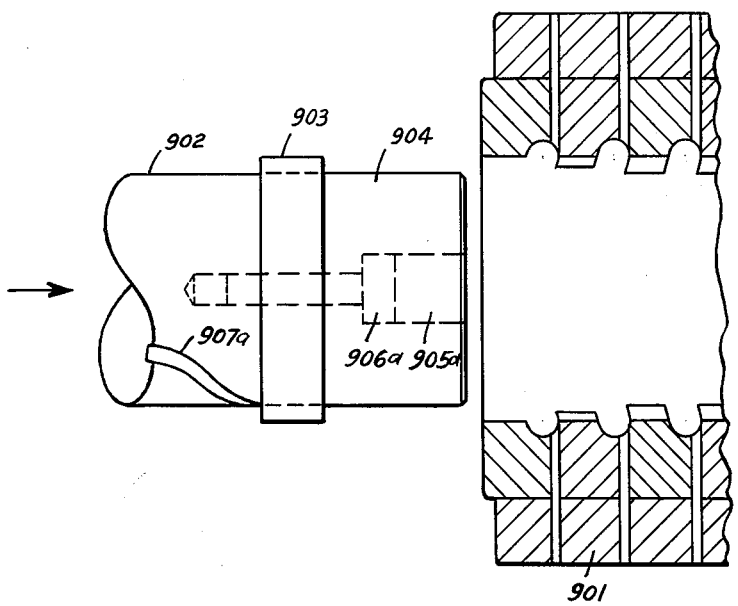
FIG. 11 shows a clamping type of driver for use in connection with a ring broach.
Figure 12:
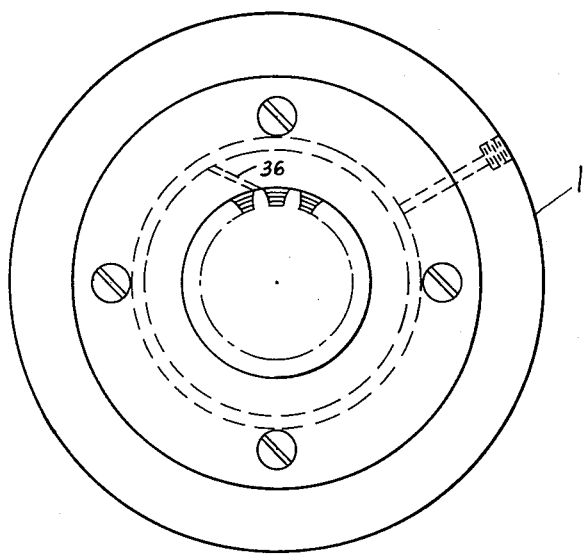
FIG. 12 is a plan view of the broach assembly.

FIG. 11 shows a ring broach 901 which is similar to the ring broach shown in FIG. 2 and which is provided with a driver 902. The gear blank or blank of whatever irregular shape on which it is desired to cut a tooth to engage the teeth is shown at 903 and is clamped by means of a clamp 904. The diameter of the clamp 904 is of slightly smaller diameter than the diameter of the pilot ring and it projects beyond the gear blank 903 and has a counterbore 905a which accommodates a clamping device 906a for removing the pilot and the blank 903 from the driver 902. This pilot assists in guiding the clamp 906a through the broach ring. In applications in cutting soft metals and the like, it has been discovered that no guide is necessary to rotate the blank 903 as it passes through the broach; however, in applications in cutting some kinds of metal, it has been found desirable to provide a helix guide member, such as a track 907a, to rotate the driver as the gear progresses through the ring broach. The track 907a is adapted to engage a fixed drive member on the frame of the machine operating the driver to rotate the blank 903 in a helical path.

The broach ring setup using two or more stages and with or without a clamp type driver can be used to broach a variety of irregular or regular shaped workpieces and, also, helical tooth gears and spur gears. The cutting action is the same in this case as described above. The driver would be either a clamp type or simple push type. The driver would have a rotating provision, such as that which is illustrated in FIG. 11 at 907a, and clamping means such as the clamp 994 to clamp the work in place in the proper location. In some applications with the above illutsrations, it will be found that it is necessary to invert the broach ring and push the workpiece upward. It is also desirable and sometimes necessary for the work to be performed in a horizontal position. When cutting soft metals and in forming teeth on small diameter pieces, it is not necessary to use the guide rings, especially when a clamp type driver is used.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A broach assembly for cutting teeth on a generally cylindrical blank comprising two axially aligned annular broach rings having helical cutting teeth on the inner sides thereof, the teeth on one of said ring rough cutting and the teeth on the other said ring finish cutting, and means to guide a blank adapted to be machined through said broach rings, said means comprising a broach ring having blunt edge teeth thereon guiding said blank through said rings in a helical path, said cutting teeth each having cutting edges on the sides and tips thereof, said cutting edges on one stage rough cutting the sides and tips of said teeth being formed and said other ring finish cutting said sides and tips of said teeth.

2. The broach assembly recited in claim 1 wherein a plurality of finish cutting teeth are provided, some of sair finish cutting teeth having cutting edges cuttin on the root surface and other said teeth cutting on the flank surface of blank teeth.

3. The broach assembly recited in claim 1 wherein a plurality of broach rings are attached together in juxtaposition and axial alignment having teeth for rough cutting a blank.

4. The broach assembly recited in claim 3 wherein a plurality of broach rings are attached together in juxtaposition having finish cutting edges thereon for finish cutting said teeth, said finish cutting teeth being disposed on the opposite side of said blunt edge teeth from said rough cutting teeth.

5. A broach assembly for cutting teeth on a cylindrical blank comprising two axially aligned annular broach rings having cutting teeth on the inner sides thereof, said cutting teeth on one said ring rough cutting and the teeth on the other said ring finish cutting said teeth, and means to guide a blank adapted to be machined through said broach rings, said means comprising a broach ring attached to said two broach rings and having blunt edge teeth engaging the edges of teeth cut by one said cutting ring, said teeth on one said ring having cutting edges on both the sides and tips thereof, said cutting edges finish cutting the sides and tips of said teeth being formed.

6. The broach asembly recited in claim 5 wherein a plurality of broach rings are provided having rough cutting edges thereon, some of said rough cutting teeth cutting on the root and other said teeth cutting on the flank of said teeth.

References Cited in the file of this patent

UNITED STATES PATENTS

| | | |
|---|---|---|
| Re. 24,284 | Kopec | Mar. 5, 1957 |
| 2,237,959 | Hansen et al. | Apr. 8, 1941 |
| 2,511,298 | Schinnerer | June 13, 1950 |

UNITED STATES PATENT OFFICE
CERTIFICATE OF CORRECTION

Patent No. 3,022,710  
February 27, 1962

Stanley J. Kopec

It is hereby certified that error appears in the above numbered patent requiring correction and that the said Letters Patent should read as corrected below.

Column 6, lines 7, 8 and 35, for "tips", each occurrence, read -- roots --.

Signed and sealed this 10th day of January 1967.

(SEAL)  
Attest:

ERNEST W. SWIDER  
Attesting Officer

EDWARD J. BRENNER  
Commissioner of Patents